US010377119B2

(12) United States Patent
Poiret

(10) Patent No.: US 10,377,119 B2
(45) Date of Patent: Aug. 13, 2019

(54) FABRICATION METHOD FOR MAKING A TRIM ELEMENT BY WELDING OF A STRUCTURAL ELEMENT AND A FUNCTIONAL ELEMENT

(71) Applicant: Faurecia Interieur Industrie, Nanterre (FR)

(72) Inventor: Gérard Poiret, Auneuil (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 1006 days.

(21) Appl. No.: 14/606,681

(22) Filed: Jan. 27, 2015

(65) Prior Publication Data

US 2015/0210054 A1 Jul. 30, 2015

(30) Foreign Application Priority Data

Jan. 28, 2014 (FR) ..................................... 14 50680

(51) Int. Cl.
*B60H 1/00* (2006.01)
*B29C 65/00* (2006.01)
(Continued)

(52) U.S. Cl.
CPC ............ *B32B 37/182* (2013.01); *B29C 65/02* (2013.01); *B29C 65/58* (2013.01);
(Continued)

(58) Field of Classification Search
CPC . B32B 37/182; B29C 65/58; B60K 2350/401; B60K 37/00; B29L 2031/3008;
(Continued)

(56) References Cited

U.S. PATENT DOCUMENTS

| | | | | |
|---|---|---|---|---|
| 6,767,041 B2 * | 7/2004 | Shiono | B60K 37/00 180/90 |
| 6,863,340 B2 * | 3/2005 | Kawahigashi | B60H 1/0055 296/208 |

(Continued)

FOREIGN PATENT DOCUMENTS

| | | |
|---|---|---|
| DE | 19623579 A1 | 12/1997 |
| EP | 1787874 A1 | 5/2007 |

(Continued)

OTHER PUBLICATIONS

Search Report for application No. FR 14 50680, dated Sep. 29, 2014, 3 pages.

*Primary Examiner* — Carson Gross
(74) *Attorney, Agent, or Firm* — Reising Ethington P.C.

(57) ABSTRACT

An assembly method for assembling a structural element and a functional element constituted of a first functional element part and a second functional element part. The method includes the steps of (a) bringing into contact the first functional element part, the second functional element part and the structural element in at least one assembly zone, with the first functional element part being in contact with the second functional element part, and the first functional element part and the second functional element part being respectively in contact with the structural element in the assembly zone, and (b) welding of the first and the second functional element parts on to the structural element in the assembly zone in a single welding pass in a manner so as to simultaneously attach the first and the second functional element parts to the structural element.

10 Claims, 3 Drawing Sheets

(51) Int. Cl.

| | |
|---|---|
| ***B29C 65/02*** | (2006.01) |
| ***B29C 65/58*** | (2006.01) |
| ***B29C 65/78*** | (2006.01) |
| ***B29L 31/00*** | (2006.01) |
| ***B29L 31/30*** | (2006.01) |
| ***B32B 37/18*** | (2006.01) |
| ***B32B 38/00*** | (2006.01) |
| ***B60K 37/00*** | (2006.01) |
| ***B62D 25/14*** | (2006.01) |

(52) U.S. Cl.

CPC ........ *B29C 65/7814* (2013.01); *B29C 66/112* (2013.01); *B29C 66/114* (2013.01); *B29C 66/131* (2013.01); *B29C 66/21* (2013.01); *B29C 66/301* (2013.01); *B29C 66/543* (2013.01); *B32B 38/00* (2013.01); *B60K 37/00* (2013.01); *B29C 66/30223* (2013.01); *B29L 2031/3008* (2013.01); *B29L 2031/3014* (2013.01); *B29L 2031/3032* (2013.01); *B29L 2031/3041* (2013.01); *B29L 2031/7374* (2013.01); *B60H 1/0055* (2013.01); *B60H 1/00564* (2013.01); *B60K 2350/401* (2013.01); *B62D 25/142* (2013.01); *Y10T 156/10* (2015.01); *Y10T 403/477* (2015.01)

(58) Field of Classification Search

CPC ..... B29L 2031/3032; B29L 2031/3041; B60H 1/0055; B60H 1/00564; B62D 25/142

USPC ...................................................... 156/91, 92

See application file for complete search history.

(56) References Cited

U.S. PATENT DOCUMENTS

| | | | | |
|---|---|---|---|---|
| 8,273,442 | B2 * | 9/2012 | Sano | B29C 66/304 156/313 |
| 2007/0108741 | A1 | 5/2007 | Yasuda et al. | |
| 2013/0112336 | A1 | 5/2013 | Robin et al. | |

FOREIGN PATENT DOCUMENTS

| | | | |
|---|---|---|---|
| FR | 2850067 | A1 | 7/2004 |
| FR | 2863549 | A1 | 6/2005 |
| FR | 2971191 | A1 | 8/2012 |

* cited by examiner

FABRICATION METHOD FOR MAKING A TRIM ELEMENT BY WELDING OF A STRUCTURAL ELEMENT AND A FUNCTIONAL ELEMENT

TECHNICAL FIELD

The present invention relates to an assembly method for assembling a lining element of the type comprising at least one structural element and one functional element made of plastic material constituted of a first functional element part and a second functional element part.

The invention also relates to a lining element obtained by such a method of assembly.

The invention is applicable for example to the assembling of an air duct joined to the structural element of a vehicle dashboard.

BACKGROUND

It is a known practice to produce such a duct in two distinct and separate parts secured to one another in a manner so as to define a closed internal volume extending between an inlet of the duct, connected for example to an air conditioning device, and at least one outlet of the duct that opens into an opening formed in the structural element. The fabrication in two parts of the duct allows for forming each of these parts in one single step of injection without any particular difficulty in the demoulding of these parts.

However, it should be ensured during the assembly by joining of the two parts to one another that the duct is sealed between the inlet and the outlet in order to prevent any leakage of air between the two parts. Such air tight sealing is usually ensured in an optimal manner by welding the parts to each other around the internal volume.

Similarly, in particular for ensuring the sealing of the duct between its outlet or outlets and the one or more corresponding openings in the structural element, it is a known practice to weld the assembled duct to the structural element.

Thus, the assembly of the duct itself and the assembly by joining of the duct to the cladding structural element requires two separate steps of welding and of providing on the assembly lines two distinctly separate tools and of interchanging the tools during the course of the assembly so as to carry out the two steps of welding. The assembly is thus costly, far from practical to implement and reduces the rates of production of the lining element.

SUMMARY

One of the goals of the invention is to overcome these drawbacks by proposing an assembly method that does not require two separate steps of welding in order to ensure the assembly of the functional element itself and the assembly of the functional element with the structural element.

To this end, the invention relates to an assembly method for assembling a lining element of the above cited type, wherein:

- contacting is brought about amongst the first functional element part, the second functional element part and the structural element in at least one assembly zone, the first functional element part being in contact with the second functional element part and the first functional element part and the second functional element part in addition being respectively in contact with the structural element in the assembly zone,

- the first and the second functional element parts are welded on to the structural element in the assembly zone in a single welding pass in a manner so as to simultaneously attach the first and the second functional element parts to the structural element.

The assembly by joining of the two parts of the functional element therebetween and the assembly of the functional element with the structural element are carried out in one same given assembly zone, which provides the ability to assemble by welding the two parts to the structural element in one single step of welding. Thus, the assembly by welding requires only one single tool that performs all of the welds in one single pass, which greatly increases the rate of assembly and reduces costs while also ensuring a satisfactory tight sealing between the two parts of the functional element and between the functional element and the structural element.

According to other aspects of an assembly method according the invention:

- the first and the second functional element parts each comprises at least one rib extending in the assembly zone, the said ribs being brought into contact with the structural element in the assembly zone and being welded to the structural element during the welding step;
- the second functional element part comprises at least one through opening in the vicinity of its rib in the assembly zone, the rib of the first functional element part passing through the said opening when bringing about the contacting of the first and the second functional element parts, the two ribs extending, substantially parallel to and in the vicinity of one another, to the structural element;
- it includes a step of fastening of the first and second functional element parts to each other over the course of their contacting, the said fastening being ensured by the reciprocal fastening elements provided on the first and on the second functional element parts;
- the reciprocal fastening elements comprise at least one snap in tab provided respectively on the first, and the second functional element parts and a snap in orifice provided respectively on the second, and the first functional element parts, the first and the second functional element parts being fastened to each other during the step of bringing about the contacting of the first and the second functional element parts, the said snap in tab and the said snap in orifice being capable of cooperating with each other;
- the first and the second parts are furthermore welded to each other during the welding of the first and second parts to the structural element;
- the structural element comprises at least one opening, the first and the second functional element parts being arranged so as to define a duct therebetween when they are brought into contact with one another, the said duct opening at least into the said opening when the first and the second functional element parts are brought into contact with the structural element;
- the functional element forms an air duct and the structural element forms the body of a vehicle dashboard.

The invention also relates to a lining element of the type comprising at least one structural element forming the external surface of the said lining element and at least one functional element fastened to the structural element, the said functional element being formed from a first functional element part and a second functional element part fastened to the structural element, obtained by a method of assembly as described here above.

According to another characteristic feature of the lining element according to the invention, the functional element is an air duct, the said duct opening out into at least one opening provided in the structural element.

BRIEF DESCRIPTION OF THE DRAWINGS

Other aspects and advantages of the invention will become apparent upon reading the description that follows, given by way of example and with reference made to the accompanying drawings, in which.

DETAILED DESCRIPTION OF THE ILLUSTRATED EMBODIMENT(S)

In the description which follows, the structural element will be described as being the body of a dashboard of a vehicle and the function element as an air duct provided in a dashboard. However, it is understood that the invention may be applicable to any functional element, fabricated in two parts that are assembled by being joined together, the functional element itself being assembled to a structural element by means of welding. Thus, the invention could for example be applied to other types of ducts that are integrated into other types of lining elements comprising of a structural element masking the duct or other types of functional elements that are integrated into a dashboard panel or the like. By way of example, the structural element may be a side of the console, a door panel or other trim or lining element in the interior of a motor vehicle. The structural element may or may not be covered by a skin.

Figure 1:
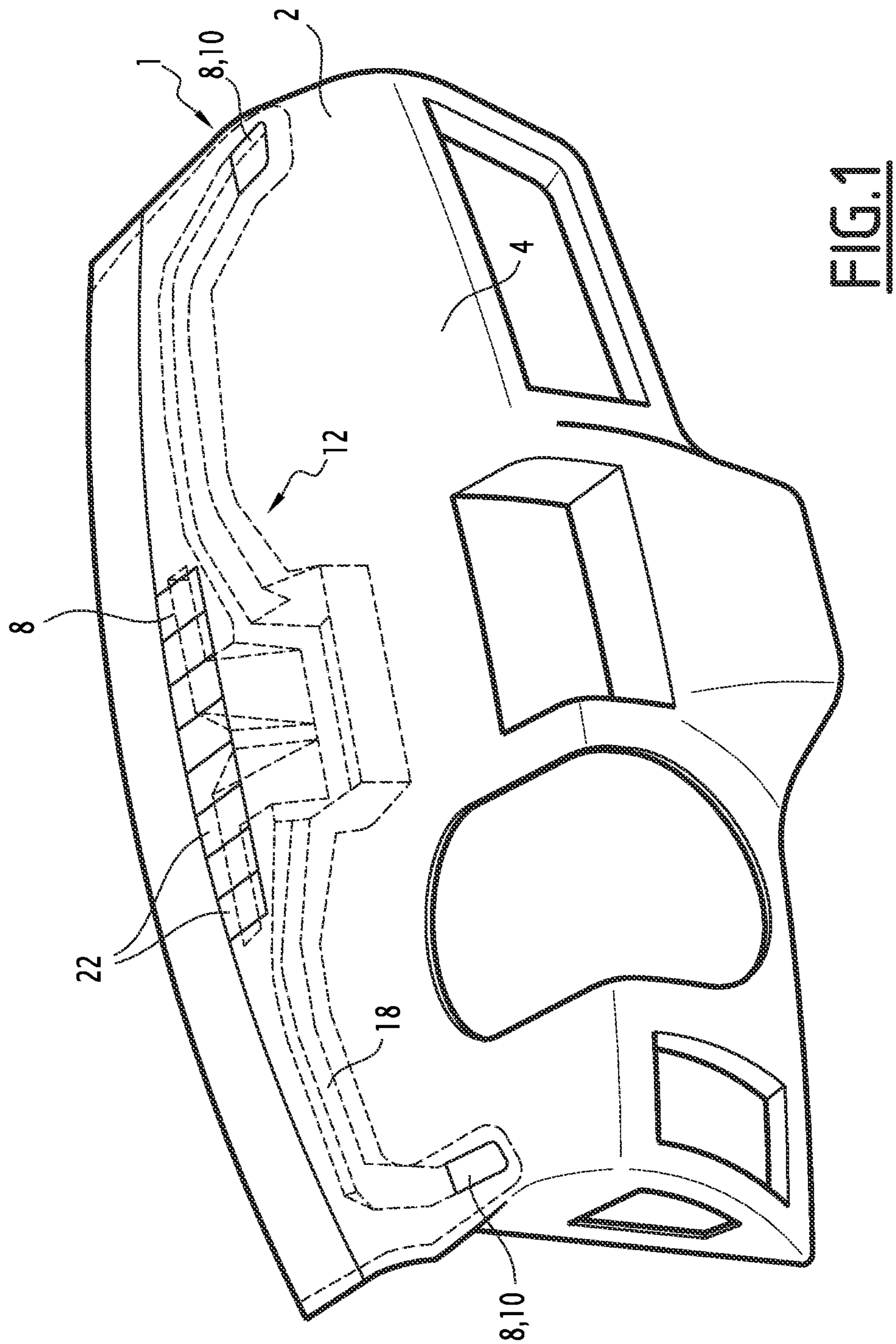
FIG. 1 is a schematic perspective view of a lining element according to the invention.

With reference to FIG. 1, it describes a lining element 1, here a dashboard, comprising a structural element 2, forming the external and visible surface of the lining element 1. The structural element 2 is for example the body of the lining element, such as the body of the dashboard, and the functional elements disposed in the lining element, such as the driver assistance instruments and systems, the air channels, the electrical connection cables and the like. The structural element 2 thus comprises a top surface 4, forming the visible surface of the lining element 1 and having a particular visual appearance, and a bottom surface 6 extending so as to be facing the functional element or elements and invisible from the exterior of the lining element.

According to the embodiment represented in the figures, the structural element 2 comprises at least one opening 8 passing through the structural element 2 and making it possible to cause the opening of an air duct towards the exterior of the lining element 1, as will be described later. In a conventional manner, when the structural element 2 is a dashboard body, it comprises at least two lateral openings 10 provided for the defrosting of the lateral windows of the vehicle and/or the ventilation of the interior of the vehicle towards the front passengers, and a series of central openings 8 extending towards the front of the vehicle and provided for defrosting the windscreen of the vehicle.

A functional element 12 is disposed under the structural element 2 so as to be facing the internal surface 6 of the latter. According to the embodiment shown in the figures, the functional element 12 is an air duct of the vehicle arranged so as to open towards the exterior of the lining element 1 through the openings 8 and 10 provided in the structural element 2.

The functional element 12 is formed by the assembly of a first part 14 of the functional element, or bottom part, and a second part 16 of the functional element, or top part. Each part 14 and 16 is arranged in order for it to be produced in a simple manner, for example by means of injection of a plastic material in a single step. The first part 14 and the second part 16 have complementary form shapes in a manner so as to define an internal volume 18 when the first part 14 is assembled by joining to the second part 16. The first part 14 and the second part 16 are positioned to be facing one another in the assembled state, and are themselves positioned to be facing the internal surface 6 of the structural element 12. According to the embodiment shown in the figures, the first part 14 defines at least one flow duct to air 18, the duct 18 being closed by the second part 16. According to one embodiment, the first part 14 defines all the air flow ducts 18 provided in the lining element while the second part 16 forms a cover closing these ducts in a manner so as to make them sealed between an air inlet, for example connected to an air conditioning device, and a plurality of outlets 22 connected to the openings 8 and 10 provided in the structural element 2. In order to do this, the first part 14 comprises for example a bottom wall 24 from which extend projecting outwards a plurality of lateral walls 26 defining channels 28, the lateral walls 26 extending to, and being closed by the second part 16 which covers these lateral walls.

According to the embodiment shown in the figures, the structural element 2 extends over the second part 16, which itself extends over the first part 14, outside the periphery 15 of the first part 14, which extends, at least in some zones around the periphery 17 of the second part 16, directly under the structural element 2. The second part 16 is arranged between the structural element 2 and the first part 14. The first part 14, the second part 16 and the structural element 2 assembled together form a sandwich stacked along a stacking direction. The stacking direction is a direction substantially perpendicular to the top surface 4 of the structural element 2.

According to other embodiments, the walls of the air duct could be formed by the second part 16 and the duct could be closed by the first part 14 or certain walls could be formed by the first part 14 and the others by the second part 16 or even a given wall could be formed by the joining of the first and second parts 14 and 16.

The first and the second parts 14 and 16 are fastened to each other by reciprocal fastening elements distributed over the surface of the first and second parts 14 and 16 and found to be facing each other when the second part 16 is positioned in place in an appropriate fashion over the first part 14. These reciprocal fastening elements are arranged as shown in the figures, in the zones where the first part 14 is in contact with the second part 16, in particular over the periphery 15, 17 of the first part 14 and second part 16.

Figure 2:
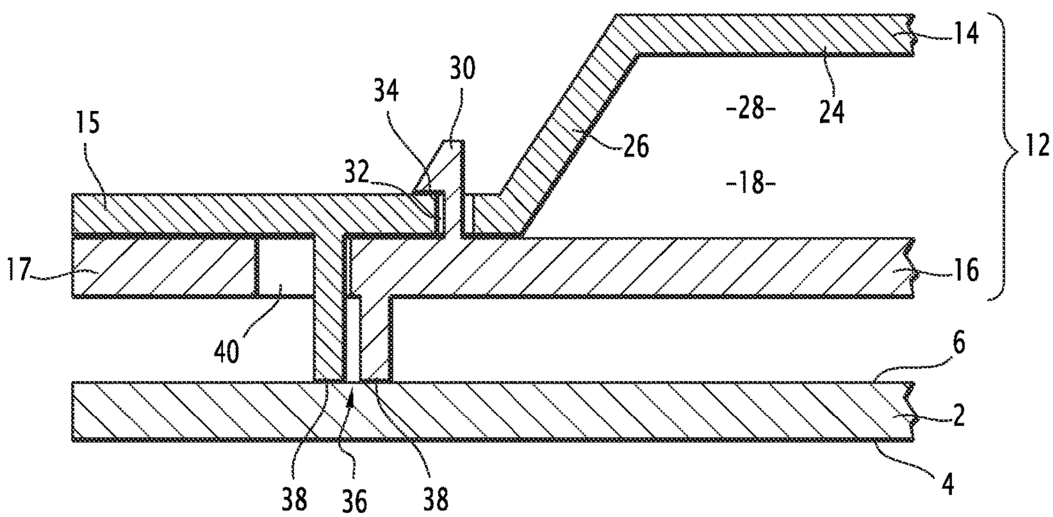
FIG. 2 is a schematic cross sectional view of a portion of a lining element assembled according to the assembly method of the invention.
Figure 3:
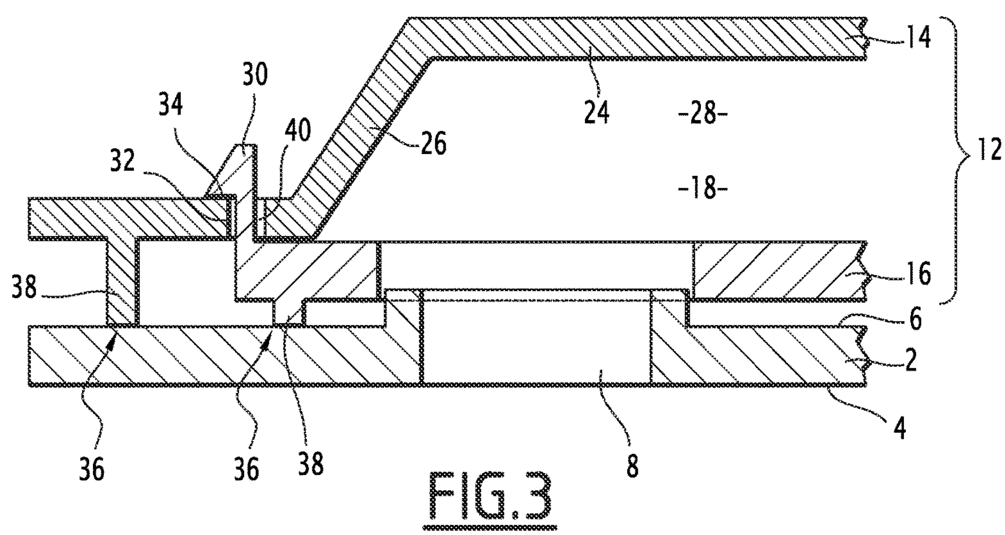
FIG. 3 is a schematic cross sectional view of a portion of a lining element as in FIG. 2 to the right of an opening.
Figure 4:
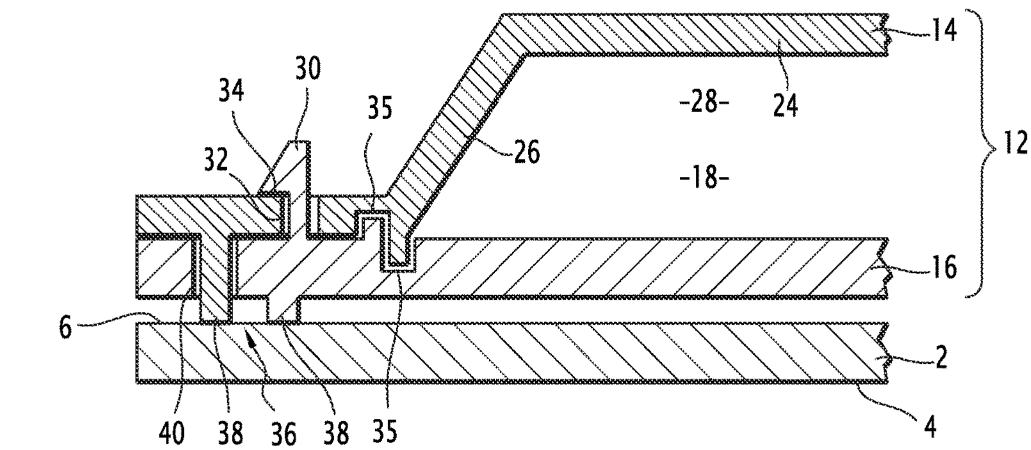
FIG. 4 is a schematic cross sectional view of a portion of a lining element according to another embodiment of the invention.
Figure 5:
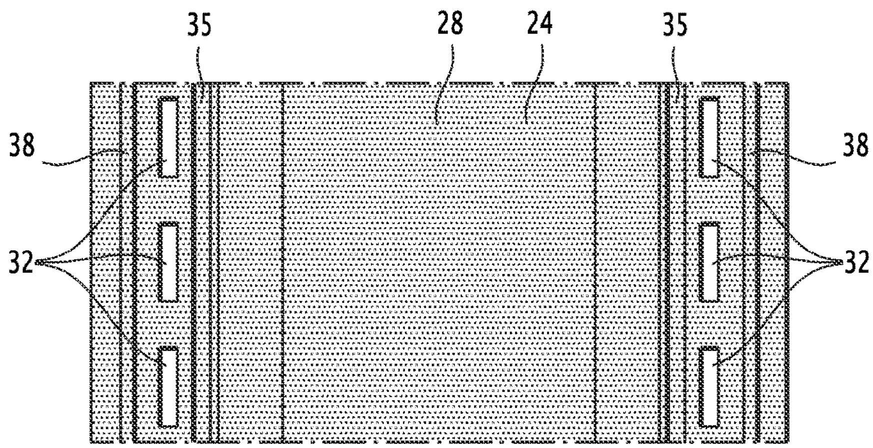
FIGS. 5 and 6 are schematic views from the top respectively of the first part and the second part of the functional elements of a lining element according to the invention.
Figure 6:
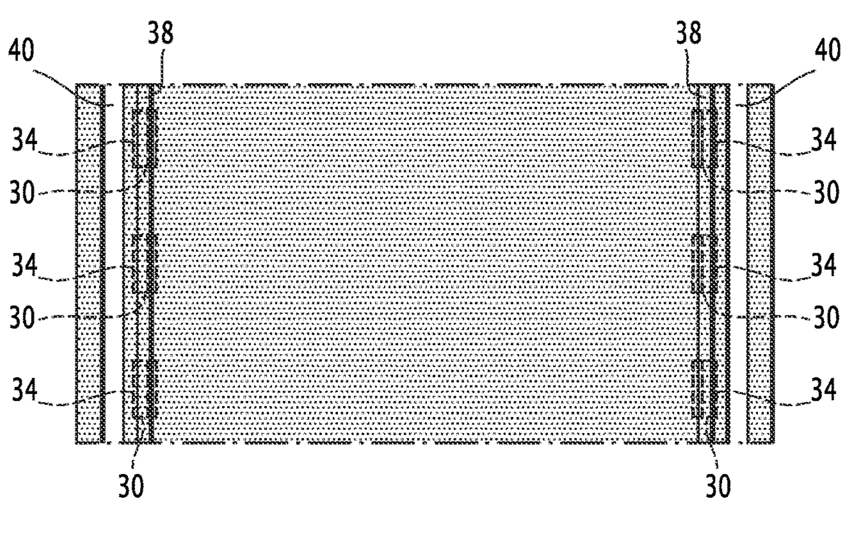

The reciprocal fastening elements are for example formed by at least one snap in tab 30 provided on one of the two parts 14, 16 and at least one snap in orifice 32 provided on the other part. By positioning in place the second part 16 over the first part 14, the snap in tab 30 enters into the engaging snap in orifice 32 and cooperates with an edge thereof in order to bring about the fastening of the second part 16 on to the first part 14, as shown in FIGS. 2 to 4. In a known manner, the tab 30 is resiliently deformable and the end of the tab 30 includes a recessed portion 34. When the second part 16 is positioned in place over the first part 14, the tab 30 is deformed so as to allow for the recessed portion 34 to enter into the orifice 32, and then the tab 30 returns into its initial position in such a manner that the recessed portion 34 comes to bear against the edge of the orifice 32 and fastens the second part on to the first part. A plurality of tabs 30 and a plurality of corresponding orifices are provided and distributed over the first and second parts 14 and 16 in a manner so as to fasten the whole of the second part 16 on to the second part 14. A fastening of such kind as the "clips" type provides the ability to integrally secure the two parts to each other, and to ensure the sealing of the ducts 18 formed by the assembly of these two parts. The advantage of the fastening elements described here above is that they can be formed integrally in one single with the first and second parts 14 and 16. Alternatively, the clips can be formed by means of patch pieces passing through the orifices provided in the first and second parts or the reciprocal fastening elements may be of a different type, such as screws or such like, for example.

The sealing of the duct or ducts formed by the two parts 14 and 16 is ensured by means of a uniform distribution of the snap in tabs 30 and the corresponding orifices 32, which serve the purpose of closing the duct or ducts over the entire length thereof. In addition, the sealing is brought about by the complementarity of the forms of the first and second parts. Thus, baffles 35 may be provided in the first and second parts 14 and 16 in the zone or zones in which the walls 26 of the duct or ducts are closed, as shown in FIG. 4. In this embodiment, the baffles 35 are used to make the connection surfaces between the first and second parts non planar, in such manner as to prevent forming an air leak zone between the connection surfaces. As can be seen in FIG. 4, the air is blocked by the baffles 35 and is prevented from passing between the two parts of the functional element 12.

By way of a variant or as a complement, in order to improve the sealing of the duct or ducts formed by the two parts, 14 and 16, these parts are in addition welded together in the zones known as assembly zones 36. In order to do this, the first part 14 and the second part 16 each comprise one or more ribs 38 extending in the or each assembly zones 36. The ribs 38 of the first and second parts 14 and 16 are arranged so as to extend substantially parallel to each other projecting out, in relation to the first and second parts 14 and 16, towards the internal surface 6 of the structural element 2 as shown in FIGS. 2 to 4. When the first part 14 and second part 16 are assembled, the rib or ribs 38 of the first part 14 thus extend in the vicinity of the rib or ribs 38 or of the second part 16 in the or each assembly zone 36.

The assembly zone extends over a limited surface area. The term 'limited surface area' is used to refer to a surface area in which the ribs are very closely spaced together and are therefore not separated from each other by any significant distance. The distance between the ribs is for example comprised between 50 mm and 500 mm.

For an assembly zone 36 that extends into the "mid piece" region, that is to say in a zone other than the peripheries 15 and 17 of the first and second parts 14 and 16, the rib or ribs 38 of the first part 14, extending under the second part 16, pass through one or more openings 40 formed in the second part 16 in the vicinity of the rib or ribs 38 thereof, in a manner such that the rib or ribs 38 of the first part 14 may extend to the internal surface 6 of the cladding 2. Thus, in this assembly zone 36, the rib or ribs 38 of the first part 14 pass through the second part 16 through the opening or openings 40 and extend in the vicinity of the rib or ribs of the second part 16, as represented in FIGS. 2 and 4.

For an assembly zone 36 that extends in the periphery 15, 17 of the first and second parts 14 and 16, as shown in FIG. 3, the rib or ribs 38 of the first and second parts 14 and 16 extend in the vicinity of the edges of the first and second parts extending in front thereof, in such manner that the rib or ribs 38 of the first part 14 are adjacent to the rib or ribs 38 of the second part 16 and extend towards the internal surface 6 of the structural element 2.

When the structural element 2 extends over the functional element 12, the internal surface 6 of the structural element 2 is thus disposed over the ribs 38 of the first and second parts 14 and 16 or in the assembly zone or zones 36, as shown in FIGS. 2 to 4. Such an arrangement makes it possible to weld together both the first part 14 and the second part 16 to the structural element 2, by fusion of the ribs 38 with the internal surface 6 of the structural element 2.

Thus, the parts of the functional element 12 may be assembled to the structural element 2 during the course of a single welding step in an assembly zone 36.

According to a particular embodiment, the ribs 38 of the first and second parts may also be welded to each other during the course of welding of these ribs with the structural element. By way of a variant, the ribs 38 are welded together only in certain zones, that is to say that the weld between the ribs 38 is not continuous over the entire length of these ribs 38.

The assembly zones 36 are divided into a plurality of areas of the lining element and more particularly around the openings 8 and 10 of the structural element, in order to ascertain that the welding in these assembly zones 36 serve to ensure the sealing of the functional element 12 and of the zones around the outlets 22 of the air duct or ducts 18.

According to various embodiments, the ribs of the first part 14 and/or the ribs 38 of the second part 16 are continuous or discontinuous. According to one particular embodiment, the ribs 38 of one of the parts are continuous, while the ribs 38 of the other party are discontinuous.

The reciprocal fastening elements may be provided in the vicinity of the assembly zones 36 as shown in FIGS. 2 to 4, and/or located at a distance therefrom.

The method for producing a lining element 1 as described above will now be described.

Over the course of a first step, the first part 14 and the second part 16 are brought into contact and assembled together by means of the reciprocal fastening elements. This bringing about of contacting results in the positioning of the ribs 38 of the first and second parts 14 and 16 in the assembly zone or zones alongside each other.

The structural element 2 and the functional element 12 thus formed are subsequently brought into contact in such manner as to apply the internal surface 6 of the structural element 2 against the ribs 38 in the assembly zone or zones or 36 and to place the outlet or outlets 22 of the duct 18 formed by the functional element in the openings 8 and 10 of the structural element 2.

A welding operation is then carried out in the assembly zone or zones 36, which permanently and simultaneously fastens the parts of the functional element 12 to the structural element 2. This operation is performed for each assembly zone 36 in one single welding pass by means of one single tool. According to one embodiment, this operation serves to weld, amongst others, at least a portion of the ribs 38 to each other.

The sealing of the or air duct or ducts 18 is ensured by means of the welding in the assembly zone 36 and by the complementarity of the forms of the first and second parts 12 and 14.

The lining element described here above can be produced quickly and in a simple manner thanks to the simultaneous welding of parts of the functional element with the structural element 2, which makes it possible to achieve significant production rates for reduced manufacturing costs.

The invention claimed is:

1. An assembly method for assembling a lining element comprising at least one structural element and one functional element made of plastic material constituted of a first functional element part and a second functional element part, wherein the method includes the following steps:

bringing into contact the first functional element part, the second functional element part and the structural element in at least one assembly zone, the first functional element part being in contact with the second functional element part, and the first functional element part and the second functional element part in addition being respectively in contact with the structural element in the assembly zone, welding of the first and the second functional element parts on to the structural element in the assembly zone in a single welding pass in a manner so as to simultaneously attach the first and the second functional element parts to the structural element, wherein the first and the second functional element parts each comprise at least one rib extending in the assembly zone, said ribs being brought into contact with the structural element in the assembly zone and being welded to the structural element during the welding step, wherein the first and the second functional element parts are welded to each other during the welding of the first and second functional element parts to the structural element, and wherein the ribs are welded together at least in certain zones during the welding step.

2. An assembly method according to claim 1, wherein the second functional element part comprises at least one through opening in the vicinity of its rib in the assembly zone, the rib of the first functional element part passing through the said opening during bringing into contact of the first and the second functional element parts, the two ribs extending, substantially parallel to and in the vicinity of one another, to the structural element.

3. An assembly method according to claim 1, including a step of fastening of the first and second functional element parts to each other over the course of their bringing into contact, the said fastening being ensured by reciprocal fastening elements provided on the first and on the second functional element parts.

4. An assembly method according to claim 3, wherein the reciprocal fastening elements comprise at least one snap in tab provided respectively on the first and the second functional element parts and a snap in orifice provided respectively on the second and the first functional element parts, the first and the second functional element parts being fastened to each other during the step of bringing into contact of the first and the second functional element parts, the said snap in tab and the said snap in orifice being capable of cooperating with each other.

5. An assembly method according to claim 1, wherein the first and the second functional element parts are arranged so as to define a duct therebetween when they are brought into contact with one another.

6. An assembly method according to claim 1, wherein the second functional element part is arranged between the structural element and the first functional element part.

7. An assembly method according to claim 1, wherein the structural element comprises at least one opening, the first and the second functional element parts being arranged so as to define a duct there between when they are brought into contact with one another, the said duct opening at least into the said opening when the first and the second functional element parts are brought into contact with the structural element.

8. An assembly method according to claim 1, wherein the functional element forms an air duct and wherein the structural element forms the body of a vehicle dashboard.

9. An assembly method according to claim 1, wherein the first and the second functional element parts have complementarily shaped forms in a manner so as to ensure a sealing between the parts.

10. An assembly method according to claim 9, wherein the complementarily shaped forms are baffles.

* * * * *